United States Patent
Hu et al.

(10) Patent No.: US 10,425,989 B2
(45) Date of Patent: Sep. 24, 2019

(54) HEATED FLOOR PANELS WITH THERMALLY CONDUCTIVE AND ELECTRICALLY INSULATING FABRIC

(71) Applicant: Goodrich Corporation, Charlotte, NC (US)

(72) Inventors: Jin Hu, Hudson, OH (US); Galdemir Cezar Botura, Akron, OH (US)

(73) Assignee: Goodrich Corporation, Charlotte, NC (US)

(*) Notice: Subject to any disclaimer, the term of this patent is extended or adjusted under 35 U.S.C. 154(b) by 268 days.

(21) Appl. No.: 15/385,494

(22) Filed: Dec. 20, 2016

(65) Prior Publication Data

US 2018/0176989 A1 Jun. 21, 2018

(51) Int. Cl.
*H05B 1/02* (2006.01)
*B32B 37/16* (2006.01)
(Continued)

(52) U.S. Cl.
CPC ............ *H05B 1/0236* (2013.01); *B32B 3/12* (2013.01); *B32B 5/02* (2013.01); *B32B 5/26* (2013.01); *B32B 7/12* (2013.01); *B32B 15/08* (2013.01); *B32B 15/14* (2013.01); *B32B 37/12* (2013.01); *B32B 37/16* (2013.01); *B64C 1/18* (2013.01);
(Continued)

(58) Field of Classification Search
CPC ...... H05B 1/0236; H05B 1/0275; H05B 3/16; B32B 15/08; B32B 15/14; B32B 5/26; B32B 5/02; B32B 37/16; B32B 37/12; B32B 3/12; B32B 7/12; B32B 2471/00; B32B 2307/718; B32B 2307/558; B32B 2307/102; B32B 2307/206; B32B 2307/302; B32B 2262/14; B32B 2262/10; B32B 2262/105; B32B 2262/106; B32B 2262/101; B32B 2260/023; B32B 2315/02; B32B 2315/085; B32B 2311/00; B32B 2607/00; B32B 2305/076; B32B 2250/05;
(Continued)

(56) References Cited

U.S. PATENT DOCUMENTS 6,611,659 B2 * 8/2003 Meisiek .................... B64C 1/18
219/213
6,834,159 B1 12/2004 Schramm
(Continued)

FOREIGN PATENT DOCUMENTS

EP 1046576 A2 10/2000
EP 2113456 B1 11/2009
(Continued)

OTHER PUBLICATIONS

Chuny Zhi et al., "Towards Thermoconductive, Electrically Insulating Polymeric Composites with Boron Nitride Nanotubes as Fillers," Advanced Materials for Optics and Electronics, vol. 19, No. 12, Apr. 20, 2009, pp. 1857-1862.
(Continued)

*Primary Examiner* — Shawntina T Fuqua
(74) *Attorney, Agent, or Firm* — Kinney & Lange, P.A.

(57) ABSTRACT

A floor panel assembly includes an insulating layer which protects a sheet heater, first and second structural layers, and a honeycomb layer for support. The floor panel assembly allows for heating of the cabin of an aircraft without mechanical damage to the sheet heater.

20 Claims, 2 Drawing Sheets

(51) Int. Cl.
  *B32B 5/02* (2006.01)
  *B32B 15/14* (2006.01)
  *B32B 5/26* (2006.01)
  *B32B 3/12* (2006.01)
  *B32B 7/12* (2006.01)
  *B32B 37/12* (2006.01)
  *H05B 3/16* (2006.01)
  *B64C 1/18* (2006.01)
  *B32B 15/08* (2006.01)

(52) U.S. Cl.
  CPC ............ *H05B 1/0275* (2013.01); *H05B 3/16* (2013.01); *B32B 2250/05* (2013.01); *B32B 2255/02* (2013.01); *B32B 2255/06* (2013.01); *B32B 2260/023* (2013.01); *B32B 2262/10* (2013.01); *B32B 2262/101* (2013.01); *B32B 2262/105* (2013.01); *B32B 2262/106* (2013.01); *B32B 2262/14* (2013.01); *B32B 2305/076* (2013.01); *B32B 2307/102* (2013.01); *B32B 2307/206* (2013.01); *B32B 2307/302* (2013.01); *B32B 2307/558* (2013.01); *B32B 2307/718* (2013.01); *B32B 2311/00* (2013.01); *B32B 2313/04* (2013.01); *B32B 2315/02* (2013.01); *B32B 2315/085* (2013.01); *B32B 2471/00* (2013.01); *B32B 2605/18* (2013.01); *B32B 2607/00* (2013.01)

(58) Field of Classification Search
  CPC ............ B32B 2605/18; B32B 2255/06; B32B 2255/02; B32B 2313/04; B64C 1/18
  See application file for complete search history.

(56) References Cited

U.S. PATENT DOCUMENTS

| | | | |
|---|---|---|---|
| 8,382,004 | B2 | 2/2013 | Asmussen et al. |
| 8,630,534 | B2 | 1/2014 | Busch et al. |
| 9,067,385 | B2 | 6/2015 | Kang et al. |
| 9,198,232 | B2 | 11/2015 | Lashmore et al. |
| 9,422,651 | B2 | 8/2016 | Roberts et al. |
| 2011/0180524 | A1 | 7/2011 | Brittingham et al. |
| 2015/0376069 | A1 | 12/2015 | Kang et al. |
| 2016/0121993 | A1 | 5/2016 | Nehring |
| 2017/0229207 | A1* | 8/2017 | Qu ................ H01B 3/004 |

FOREIGN PATENT DOCUMENTS

| | | |
|---|---|---|
| GB | 2423224 B | 4/2008 |
| WO | WO0117850 A1 | 3/2001 |

OTHER PUBLICATIONS

Chunyi Y. et al., "Dielectric and Thermal Properties of Expoxy/Boron Nitride Nanotubes Composites," Pure & Applied Chemistry, vol. 82, No. 11, Jan. 11, 2010, pp. 2175-2183.

Wenjun Meng et al., "Polymer Composites of Boron Nitride Nanotubes and Nanosheets," Journal of Materials Chemistry C, vol. 2, No. 47, Jan. 1, 2014, pp. 10049-10061.

Tiano Amanda L. et al., "Boron Nitride Nanotubes Synthesis and Applications," Visual Communications and Image Processing, vol. 9060, Apr. 16, 2014, pp. 906006-1-10061.

Extended European Search Report for EP Application No. 17209058.1, dated Feb. 28, 2018, 9 Pages.

* cited by examiner

HEATED FLOOR PANELS WITH THERMALLY CONDUCTIVE AND ELECTRICALLY INSULATING FABRIC

BACKGROUND

Aircraft cabins require heated floor panels in the galley and other areas to temperature-control the environment inside the aircraft. Generally, the heated floor panels must also be damage resistant such that they continue to heat the area when they are stepped on, rolled over by carts, or other items come into contact with the floor of the aircraft cabin. Currently, heated floor panels have heating elements layered under a metallic skin. In this configuration, the heated floor panels are susceptible to impact and piercing damage.

The materials used to protect heated floor panels must be thermally conductive, allowing transfer of heat between the heater and the cabin of the aircraft, but must also be electrically insulating to prevent shorting of the heater. Most thermally conductive materials are also electrically conductive, limiting the choice of materials.

SUMMARY

A floor panel assembly includes an insulating layer comprising a material selected from the group consisting of nano alumina and boron nitride nanotubes, a sheet heater, the sheet heater attached to the insulating layer by a first adhesive, a first structural layer attached to the sheet heater opposite the insulating layer by a second adhesive, a honeycomb layer attached to the first structural layer opposite the sheet heater with a third adhesive, and a second structural layer attached to the honeycomb opposite the first structural layer with a fourth adhesive.

A method of creating a floor panel assembly includes adhering an insulating layer to a heater with a first adhesive, the insulating layer containing a material selected from the group consisting of nano alumina and boron nitride nanotubes, bonding the heater to a first structural layer opposite the insulating layer with a second adhesive, making a first structural layer, attaching the first structural layer to a honeycomb opposite the heater, making a second structural layer, and attaching the second structural layer to the honeycomb opposite the first structural layer.

DETAILED DESCRIPTION

A heated floor panel assembly can be protected by a layer of a strong, thermally conductive but electrically insulating material such as boron nitride nanotube (BNNT) fabric or nano alumina fabric. BNNT and nano alumina fabrics are strong enough to mitigate mechanical damage from piercing or object impact. BNNT fabric additionally provides acoustic insulation, and can protect a de-icing heater on a breeze side of an airfoil or other aircraft structure from vibrational disturbances. Additionally, nano alumina fabric is environmentally safe. Commonly, nano alumina is used to filter water, is digested naturally in the environment, and is nontoxic.

Figure 1:
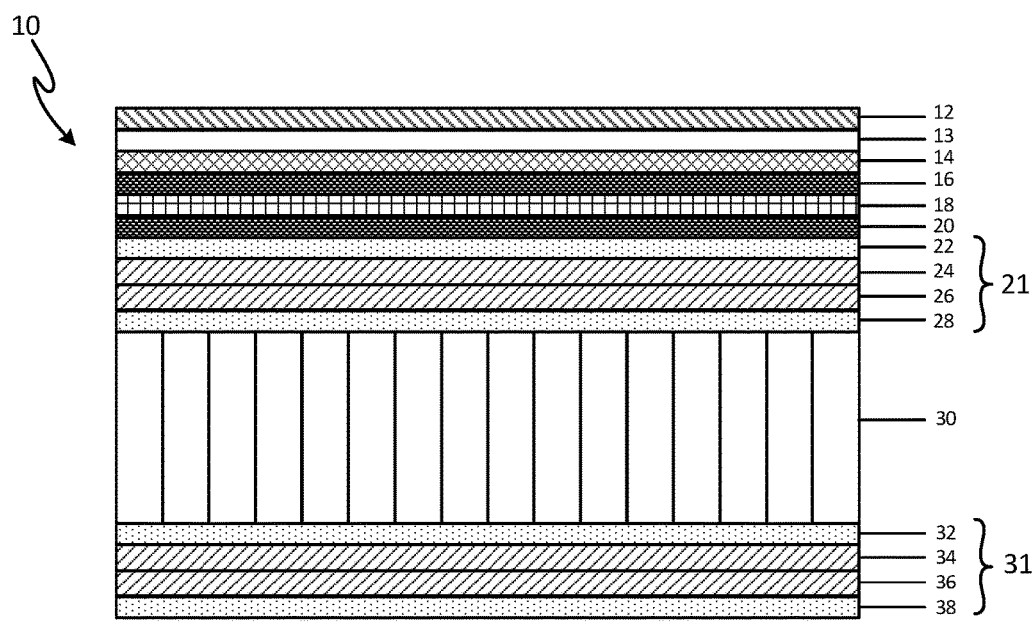
FIG. 1 is a schematic diagram of a heated floor panel assembly.

FIG. 1 is a schematic diagram of heated floor panel assembly 10. Heated floor panel assembly 10 includes skin layer 12, first adhesive 13, insulating layer 14, second adhesive 16, heater 18, third adhesive 20, first structural layer 21, honeycomb 30, and second structural layer 31. First structural layer 21 contains first glass fiber pre-preg 22, first and second carbon fiber pre-pregs 24, 26, and second glass fiber pre-preg 28. Second structural layer 31 includes third glass fiber pre-preg 32, third carbon fiber pre-preg 34, fourth carbon fiber pre-preg 36, and fourth glass fiber pre-preg 38.

Skin layer 12 is an outer protective layer for heated floor panel assembly 10. Skin layer 12 can be metallic, such as titanium, nickel, or other appropriate metals or alloys. Alternatively, skin layer 12 can be comprised of a pre-impregnated (pre-preg) glass fiber fabric. Skin layer 12 can be between 2-6 mm, depending on the needs of the assembly. Skin layer 12 protects heater 18 from some impact and piercing damage.

Insulating layer 14 adds a second layer of protection to heater 18. Insulating layer 14 is either a BNNT pre-preg fabric or a nano alumina pre-preg fabric. Both are strong fabrics that can effectively mitigate mechanical damage caused by outside forces, such as shoes stepping on floor panels, carts rolling over floor panels, or other objects. Insulating layer 14 is attached to skin layer 12 opposite the cabin of the aircraft.

BNNT pre-preg fabric is a nontoxic, electrically insulating, and thermally conductive fabric material made of boron nitride nanotubes and an appropriate polymer resin. BNNTs are a type of nanostructure comprised of hexagonal B-N bond networks. BNNT bonds have partial ionic character due to the difference in electronegativity of nitrogen and boron. This causes BNNTs to be electrically insulating. Moreover, BNNTs exhibit thermal conductivity, thermal stability, chemical stability and, when in fabric form, superhydrophobicity. Thus, BNNTs share mechanical properties of CNTs, but have additional advantages such as greater thermal and chemical stability, and optical and infrared transparency.

An alternative for insulating layer 14 is a nano alumina fabric. Nano alumina is aluminum oxide sized in nanometer dimensions. Nano alumina pre-preg fabric includes glass fibers which are mixed with aluminum oxide. In this embodiment, nano alumina pre-preg fabric is impregnated with a polymer resin, such as an epoxy, a phenolic polymer, or a bismaleimide polymer. The resulting fabric is then cured before it is used.

Heater 18 is a heating element which heats floor panel assembly 10 and regulates the temperature of the floor of an aircraft cabin. Heater 18 is typically a sheet heater, and can be a metallic heater, a carbon nanotube (CNT) heater, or other appropriate heating material. Heater 18 is attached to insulating layer 14 by first adhesive 16, opposite skin layer 12. First adhesive 16 can be an epoxy film adhesive, a scrim layer, or other appropriate adhesive.

First structural layer 21 is attached to heater 18 opposite insulating layer 14 by second adhesive 20. Second adhesive 20 is similar to first adhesive 16, and can be an epoxy film adhesive or scrim layer. Structural layer 21 includes first fiberglass pre-preg layer 22, first carbon fiber pre-preg layer 24, second carbon fiber pre-preg layer 26, and second fiberglass pre-preg layer 28. Structural layer 21 provides structural support to heated floor panel assembly 10.

Honeycomb 30 is attached to structural layer 21 opposite heater 18. Honeycomb 30 provides structural support for heater floor panel assembly 10. Typically, honeycomb 30 is made of a metallic or composite material.

Second structural layer 31 is attached to honeycomb 30 opposite first structural layer 21. Second structural layer 31 is similar to first structural layer 21, and contains similar components. Second structural layer 31 includes third fiberglass pre-preg layer 32, third carbon fiber pre-preg layer 34, fourth carbon fiber pre-preg layer 36, and fourth fiberglass pre-preg layer 38. Second structural layer 31 faces away from the cabin of an aircraft.

BNNT fabric and nano alumina fabric are thermally conductive materials. Thus, heated floor panel assembly 10 does not require extra power to allow heater 18 to heat assembly 10 through insulating layer 14 and skin 12. Additionally, BNNT fabric and nano alumina fabric are very light weight and do not add noticeable thickness to heated floor panel assembly 10. Nonetheless, insulating layer 14 creates a tough layer between heater 18 and a cabin environment, protecting heated floor panel assembly 10 from mechanical damage. Moreover, insulating layer 14 is an extra electrically insulating layer, which prevents short circuiting between heater 18 and metallic skin layer 12.

Figure 2:
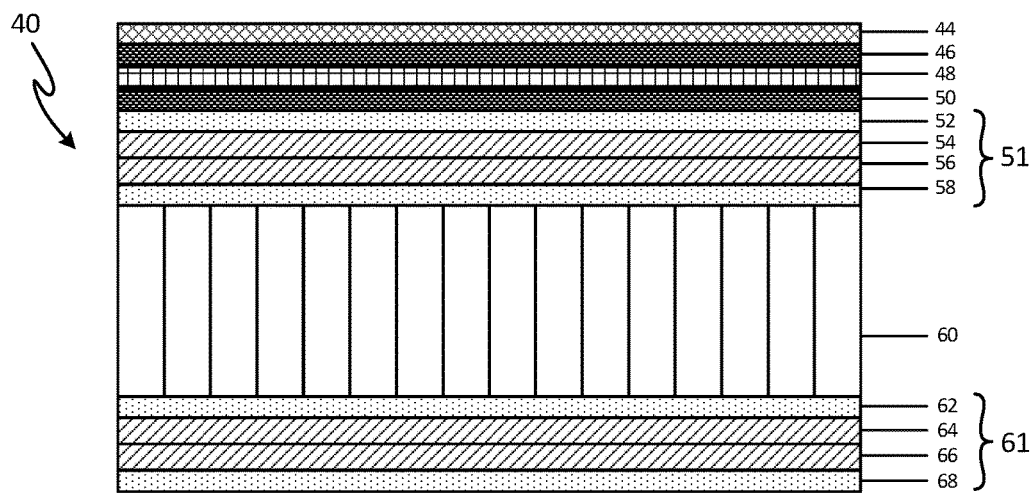
FIG. 2 is a schematic diagram of a heated floor panel assembly in a different embodiment.

FIG. 2 is a schematic diagram of heated floor panel assembly 40. Heated floor panel assembly 40 is similar to heated floor panel assembly 10 of FIG. 1, and contains similar components, but does not contain a skin layer. Unless otherwise noted, the components of assembly 40 have similar properties to the components of assembly 10.

Heated floor panel assembly 40 insulating layer 44, first adhesive 46, heater 48, second adhesive 50, first structural layer 51, honeycomb 60, and second structural layer 61. First structural layer 51 contains first glass fiber pre-preg 52, first and second carbon fiber pre-pregs 54, 56, and second glass fiber pre-preg 58. Second structural layer 61 includes third glass fiber pre-preg 62, third carbon fiber pre-preg 64, fourth carbon fiber pre-preg 66, and fourth glass fiber pre-preg 68.

Heated floor panel assembly 40 does not contain a metallic skin on the cabin-facing surface of the assembly. Instead, insulating layer 44 acts as a skin, replacing a metallic skin as discussed with regards to FIG. 1. Insulating layer 44 (whether BNNT fabric or nano alumina fabric) is tough enough that it can replace an outer metallic skin and still protect heater 48 from mechanical damage. Additionally, heater 48 is still electrically insulated by insulating layer 44. But insulating layer 44 is still thermally conductive, requiring less power to heat heated floor panel assembly 40.

Figure 3:
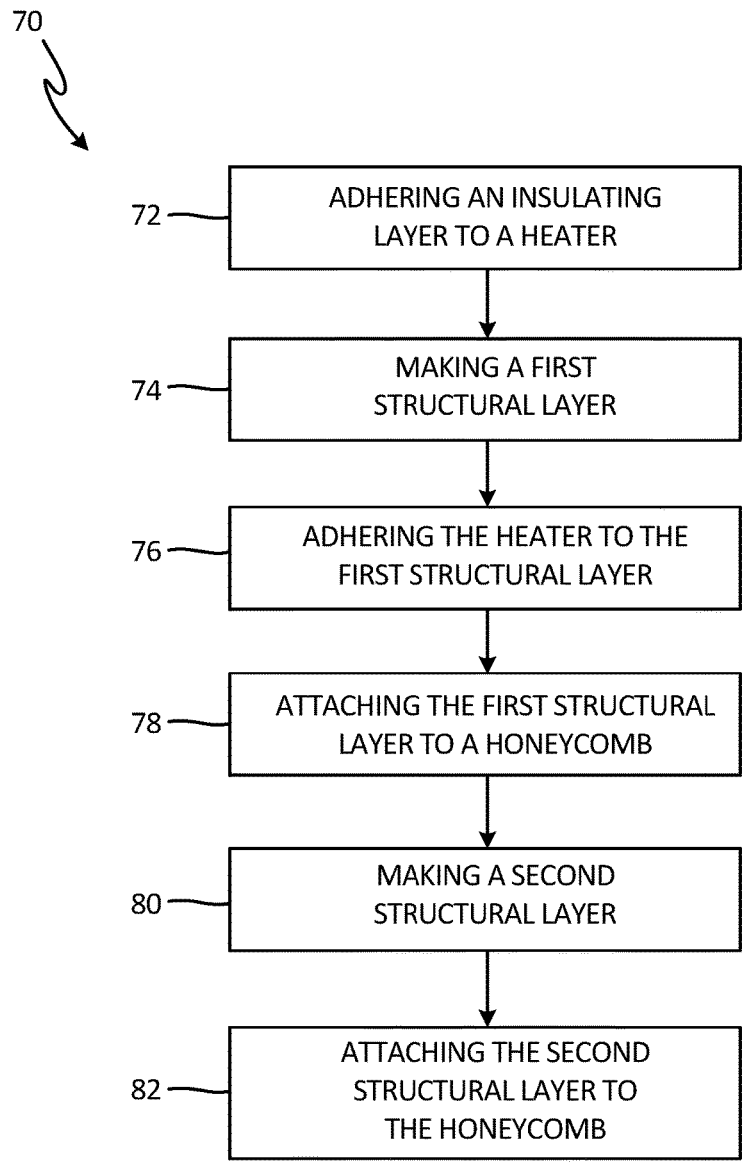
FIG. 3 is a flow chart depicting a method of making a heated floor panel assembly.

FIG. 3 is a flow chart depicting method 70 of making a heated floor panel assembly. Method 70 begins with step 72, adhering an insulating layer to a heater. In step 72, either a BNNT fabric or a nano alumina fabric is chosen as an insulating layer for the heated floor panel assembly.

Either fabric can be commercially obtained or created in the laboratory. Several methods of synthesizing BNNTs can be used, including catalyst-based chemical vapor deposition, ball-milling and annealing methods, arc-discharge, plasma-enhanced pulsed laser deposition, laser vaporization, or other methods. The BNNTs are then impregnated with a polymer resin, such as an epoxy, a phenolic polymer or a bismaleimide. The fabric is then cured before being used. Alternatively, some BNNT fabrics are commercially available.

Nano alumina pre-preg fabric is sometimes referred to as "fuzzy" due to its structure. Nano alumina is aluminum oxide sized in nanometer dimensions. Nano alumina pre-preg fabric includes glass fibers which are mixed with aluminum oxide. The aluminum oxide fibers "grow" on the surfaces of glass fibers, appearing "fuzzy" in the completed fabric. In this embodiment, nano alumina pre-preg fabric is impregnated with a polymer resin, such as an epoxy, a phenolic polymer, or a bismaleimide polymer. The resulting fabric is then cured before it is used.

The insulating layer is adhered to a heater with a first adhesive. The heater may be a traditional metallic heater, or a carbon nanotube (CNT) heater. Typically, the heater is a sheet heater that is layered with the insulating layer. The insulating layer and the heater are attached to each other with a first adhesive, which may be an epoxy or a scrim. The first adhesive is usually a film adhesive.

Optionally, a metallic skin layer can be attached to the insulating layer opposite the heater with another adhesive. The metallic skin layer can provide extra mechanical protection to the heater. However, in some instances, the insulating layer is sufficient to protect the heater and an extra metallic skin layer is not needed.

Next, in step 74, a first structural layer is assembled. The first structural layer includes a first fiberglass pre-preg layer, a first carbon fiber pre-preg layer, a second carbon pre-preg layer, and a second fiberglass pre-preg layer. The carbon fiber pre-preg layers are sandwiched between the fiberglass pre-preg layers.

In step 76, the first structural layer is adhered to the heater opposite the insulating layer with an adhesive. The adhesive can be an epoxy film adhesive. The heater is attached to the first fiberglass pre-preg layer of the first structural layer.

In step 78, the first structural layer is attached to a honeycomb layer. The honeycomb layer can be metallic or a composite, depending on the needs of the assembly, and has a honeycomb lattice shape. The second fiberglass layer is attached to the honeycomb layer, such that the honeycomb layer is opposite the heater.

Next, in step 80, a second structural layer is made. Similar to the first structural layer, it contains two layers of fiberglass pre-preg and two layers of carbon fiber pre-preg, with the carbon fiber pre-preg layers sandwiched between the fiberglass pre-preg layers. In step 82, the second structural layer is attached to the honeycomb layer opposite the first structural layer. The assembly is then cured.

The heated floor panel assembly is better able to resist mechanical damage, has higher impact resistance, and does not short circuit. The use of a BNNT fabric or a nano alumina fabric better protects the heater while insulating the heater from an outer metallic skin. Additionally, because BNNT and nano alumina are thermally conductive, this assembly does not consume additional power, nor does the insulating layer add noticeable weight or thickness.

Discussion of Possible Embodiments

The following are non-exclusive descriptions of possible embodiments of the present invention.

A floor panel assembly includes an insulating layer comprising a material selected from the group consisting of nano alumina and boron nitride nanotubes, a sheet heater, the sheet heater attached to the insulating layer by a first adhesive, a first structural layer attached to the sheet heater opposite the insulating layer by a second adhesive, a honeycomb layer attached to the first structural layer opposite the sheet heater with a third adhesive, and a second structural layer attached to the honeycomb opposite the first structural layer with a fourth adhesive.

The assembly of the preceding paragraph can optionally include, additionally and/or alternatively, any one or more of the following features, configurations and/or additional components:

The assembly includes a skin layer attached to the insulating fabric opposite the sheet heater with a fifth adhesive.

The skin layer is metallic.

The insulating layer is a nano alumina fabric.

The insulating layer is a boron nitride nanotube fabric.

The first structural layer includes a first fiberglass pre-impregnated layer attached to the sheet heater opposite the insulating layer with a fourth adhesive, a first carbon fiber pre-impregnated layer attached to the first fiberglass pre-impregnated layer opposite the sheet heater, a second carbon fiber pre-impregnated layer attached to the first carbon fiber pre-impregnated layer opposite the first fiberglass pre-impregnated layer, and a second fiberglass pre-impregnated layer attached to the second carbon fiber pre-impregnated layer opposite the first carbon fiber pre-impregnated layer and the honeycomb layer.

The second structural layer includes a third fiberglass pre-impregnated layer attached to the honeycomb layer opposite the first structural layer, a third carbon fiber pre-impregnated layer attached to the third fiberglass pre-impregnated layer opposite the honeycomb layer, a fourth carbon fiber pre-impregnated layer attached to the third carbon fiber pre-impregnated layer opposite the third fiberglass pre-impregnated layer, and a fourth fiberglass pre-impregnated layer attached to the fourth carbon fiber pre-impregnated layer opposite the third carbon fiber pre-impregnated layer.

The honeycomb layer is selected from the group consisting of a metal, a composite, and an alloy.

The first and second adhesive layers are film adhesives.

A method of creating a floor panel assembly includes adhering an insulating layer to a heater with a first adhesive, the insulating layer containing a material selected from the group consisting of nano alumina and boron nitride nanotubes, making a first structural layer, bonding the heater to the first structural layer opposite the insulating layer with a second adhesive, attaching the first structural layer to a honeycomb opposite the heater, making a second structural layer, and attaching the second structural layer to the honeycomb opposite the first structural layer.

The method of the preceding paragraph can optionally include, additionally and/or alternatively, any one or more of the following features, configurations and/or additional components:

The method includes bonding a skin layer to the insulating layer with a third adhesive.

The insulating layer is a nano alumina fabric.

The insulating layer is a boron nitride nanotube fabric.

Making the first structural layer includes bonding a first fiberglass pre-impregnated fabric to a first carbon fiber pre-impregnated fabric, bonding a second carbon fiber pre-impregnated fabric to the first carbon fiber pre-impregnated fabric opposite the first fiberglass pre-impregnated fabric, and bonding a second fiberglass pre-impregnated fabric to the second carbon fiber pre-impregnated fabric opposite the first carbon fiber pre-impregnated fabric.

Adhering the heater to the first structural layer comprises attaching the heater to the first fiberglass pre-impregnated layer opposite the first carbon fiber pre-impregnated layer.

Attaching the first structural layer to a honeycomb comprises bonding the second fiberglass pre-impregnated layer to the honeycomb.

Making the second structural layer includes bonding a third fiberglass pre-impregnated fabric to a third carbon fiber pre-impregnated fabric, bonding a fourth carbon fiber pre-impregnated fabric to the third carbon fiber pre-impregnated fabric opposite the third fiberglass pre-impregnated fabric, and bonding a fourth fiberglass pre-impregnated fabric to the fourth carbon fiber pre-impregnated fabric opposite the third carbon fiber pre-impregnated fabric.

Attaching the second structural layer to the honeycomb comprises bonding the third fiberglass pre-impregnated layer to the honeycomb.

The method includes curing the assembly.

Curing the assembly comprises first curing the insulating layer, then curing the first and second adhesives.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A floor panel assembly comprising:
   an insulating layer comprising a resin-impregnated fabric and a material selected from the group consisting of nano alumina and boron nitride nanotubes, wherein the material is aligned in the resin;
   a sheet heater, the sheet heater attached to the insulating layer by a first adhesive;
   a first structural layer attached to the sheet heater opposite the insulating layer by a second adhesive;
   a honeycomb layer attached to the first structural layer opposite the sheet heater with a third adhesive; and
   a second structural layer attached to the honeycomb opposite the first structural layer with a fourth adhesive.

2. The assembly of claim 1, further comprising a skin layer attached to the insulating fabric opposite the sheet heater with a fifth adhesive.

3. The assembly of claim 2, wherein the skin layer is metallic.

4. The assembly of claim 1, wherein the insulating layer is a nano alumina fabric.

5. The assembly of claim 1, wherein the insulating layer is a boron nitride nanotube fabric.

6. The assembly of claim 1, wherein the first structural layer comprises:
   a first fiberglass pre-impregnated layer attached to the sheet heater opposite the insulating layer with a fourth adhesive;
   a first carbon fiber pre-impregnated layer attached to the first fiberglass pre-impregnated layer opposite the sheet heater;
   a second carbon fiber pre-impregnated layer attached to the first carbon fiber pre-impregnated layer opposite the first fiberglass pre-impregnated layer; and
   a second fiberglass pre-impregnated layer attached to the second carbon fiber pre-impregnated layer opposite the first carbon fiber pre-impregnated layer, and the honeycomb layer.

7. The assembly of claim 1, A floor panel assembly comprising:

an insulating layer comprising a material selected from the group consisting of nano alumina and boron nitride nanotubes;

a sheet heater, the sheet heater attached to the insulating layer by a first adhesive;

a first structural layer attached to the sheet heater opposite the insulating layer by a second adhesive;

a honeycomb layer attached to the first structural layer opposite the sheet heater with a third adhesive; and a second structural layer attached to the honeycomb opposite the first structural layer with a fourth adhesive, wherein the second structural layer comprises:

a third fiberglass pre-impregnated layer attached to the honeycomb layer opposite the first structural layer;

a third carbon fiber pre-impregnated layer attached to the third fiberglass pre-impregnated layer opposite the honeycomb layer;

a fourth carbon fiber pre-impregnated layer attached to the third carbon fiber pre-impregnated layer opposite the third fiberglass pre-impregnated layer; and a fourth fiberglass pre-impregnated layer attached to the fourth carbon fiber pre-impregnated layer opposite the third carbon fiber pre-impregnated layer.

8. The assembly of claim 1, wherein the honeycomb layer is selected from the group consisting of a metal, a composite, and an alloy.

9. The assembly of claim 1, wherein the first and second adhesive layers are film adhesives.

10. A method of creating a floor panel assembly comprising:

adhering an insulating layer to a heater with a first adhesive, the insulating layer containing a resin-impregnated fabric and a material selected from the group consisting of nano alumina and boron nitride nanotubes, wherein the material is aligned in the resin;

making a first structural layer;

adhering the heater to the first structural layer opposite the insulating layer with a second adhesive;

attaching the first structural layer to a honeycomb opposite the heater;

making a second structural layer; and attaching the second structural layer to the honeycomb opposite the first structural layer.

11. The method of claim 10, further comprising bonding a skin layer to the insulating layer with a third adhesive.

12. The method of claim 10, wherein the insulating layer is a nano alumina fabric.

13. The method of claim 10, wherein the insulating layer is a boron nitride nanotube fabric.

14. The method of claim 10, wherein making the first structural layer comprises:

bonding a first fiberglass pre-impregnated fabric to a first carbon fiber pre-impregnated fabric;

bonding a second carbon fiber pre-impregnated fabric to the first carbon fiber pre-impregnated fabric opposite the first fiberglass pre-impregnated fabric; and bonding a second fiberglass pre-impregnated fabric to the second carbon fiber pre-impregnated fabric opposite the first carbon fiber pre-impregnated fabric.

15. The method of claim 14, wherein adhering the heater to the first structural layer comprises attaching the heater to the first fiberglass pre-impregnated layer opposite the first carbon fiber pre-impregnated layer.

16. The method of claim 15, wherein attaching the first structural layer to a honeycomb comprises bonding the second fiberglass pre-impregnated layer to the honeycomb.

17. A method of creating a floor panel assembly comprising:

adhering an insulating layer to a heater with a first adhesive, the insulating layer containing a material selected from the group consisting of nano alumina and boron nitride nanotubes;

making a first structural layer;

adhering the heater to the first structural layer opposite the insulating layer with a second adhesive;

attaching the first structural layer to a honeycomb opposite the heater;

making a second structural layer, wherein making the second structural layer comprises:

bonding a third fiberglass pre-impregnated fabric to a third carbon fiber pre-impregnated fabric;

bonding a fourth carbon fiber pre-impregnated fabric to the third carbon fiber pre-impregnated fabric opposite the third fiberglass pre-impregnated fabric; and bonding a fourth fiberglass pre-impregnated fabric to the fourth carbon fiber pre-impregnated fabric opposite the third carbon fiber pre-impregnated fabric; and attaching the second structural layer to the honeycomb opposite the first structural layer.

18. The method of claim 17, wherein attaching the second structural layer to the honeycomb comprises bonding the third fiberglass pre-impregnated layer to the honeycomb.

19. The method of claim 10, further comprising curing the assembly.

20. The method of claim 19, wherein curing the assembly comprises first curing the insulating layer, then curing the first and second adhesives.

* * * * *